United States Patent [19]

Marvelli

[11] Patent Number: 4,725,016

[45] Date of Patent: Feb. 16, 1988

[54] LIMITED SLIP CLUTCH FOR PREVENTING VIDEOTAPE BREAKAGE IN A VIDEO CASSETTE

[76] Inventor: Richard Marvelli, 2332 Webster Ave., Bellmore, N.Y. 11710

[21] Appl. No.: 32,240

[22] Filed: Mar. 31, 1987

[51] Int. Cl.⁴ ............... G11B 15/32; B65H 75/14
[52] U.S. Cl. ............................. 242/199; 242/71.8
[58] Field of Search ............ 242/55, 179, 46.4, 68.3, 242/68.5, 71, 71.8, 77, 78, 197–201, 118, 118.4, 46.21; 464/30, 89; 360/93, 96.1, 96.3, 132

[56] References Cited

U.S. PATENT DOCUMENTS

| | | | |
|---|---|---|---|
| 3,080,735 | 3/1963 | Blom, Jr. t al. | 464/89 |
| 3,389,872 | 6/1968 | Lyman | 242/71.8 |
| 3,819,130 | 6/1974 | Moxness | 242/199 |
| 4,059,245 | 11/1977 | Hirose | 242/201 |
| 4,512,535 | 4/1985 | Dickson et al. | 242/200 |
| 4,606,511 | 8/1986 | Machida | 242/71.8 |

Primary Examiner—David Werner
Attorney, Agent, or Firm—Michael I. Kroll

[57] ABSTRACT

A limited slip clutch for preventing videotape breakage in a video cassette is provided and consists of a friction exerting member positioned between a moveable spline hub and a spool in the video cassette which will allow the hub to continue to turn when the spool stops short at the end of the videotape.

5 Claims, 4 Drawing Figures

LIMITED SLIP CLUTCH FOR PREVENTING VIDEOTAPE BREAKAGE IN A VIDEO CASSETTE

BACKGROUND OF THE INVENTION

1. Field of the Invention

The instant invention relates generally to video cassette recorders and more specifically it relates to a limited slip clutch for preventing videotape breakage in a video cassette.

2. Description of the Prior Art

There are many parts in video cassette recorders that can wear or go bad and cause the mechanism within the machine to rewind too hard and not stop in time at the end of a videotape within a video cassette, causing the videotape to break.

SUMMARY OF THE INVENTION

The limited slip clutch will permit the videotape to reach its end without extensive pressure that can cause breakage do to faulty parts in the video cassette recorder.

A primary object of the present invention is to provide a limited slip clutch that will overcome the shortcomings of the prior art.

Another object is to provide a limited slip clutch comprising a friction exerting sleeve member positioned between a moveable spline hub and a spool in a video cassette which will allow the hub to continue to turn when the spool stops short at the end of the videotape thus preventing damage to the videotape.

An additional object is to provide a limited slip clutch in which the spool is structured to hold the sleeve member and the hub within its center and still allow them both to turn thereabout.

A most important object is to provide a slip clutch to cushion the effect that a video cassette player exerts on the video tape when said player physically stops the cassette as prior to this invention the aforsaid stopping is sudden and thus exerts a sudden impact on the tape which in turn often wears and breaks said tape.

A further object is to provide a limited slip clutch that is simple and easy to use.

A still further object is to provide a limited slip clutch that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
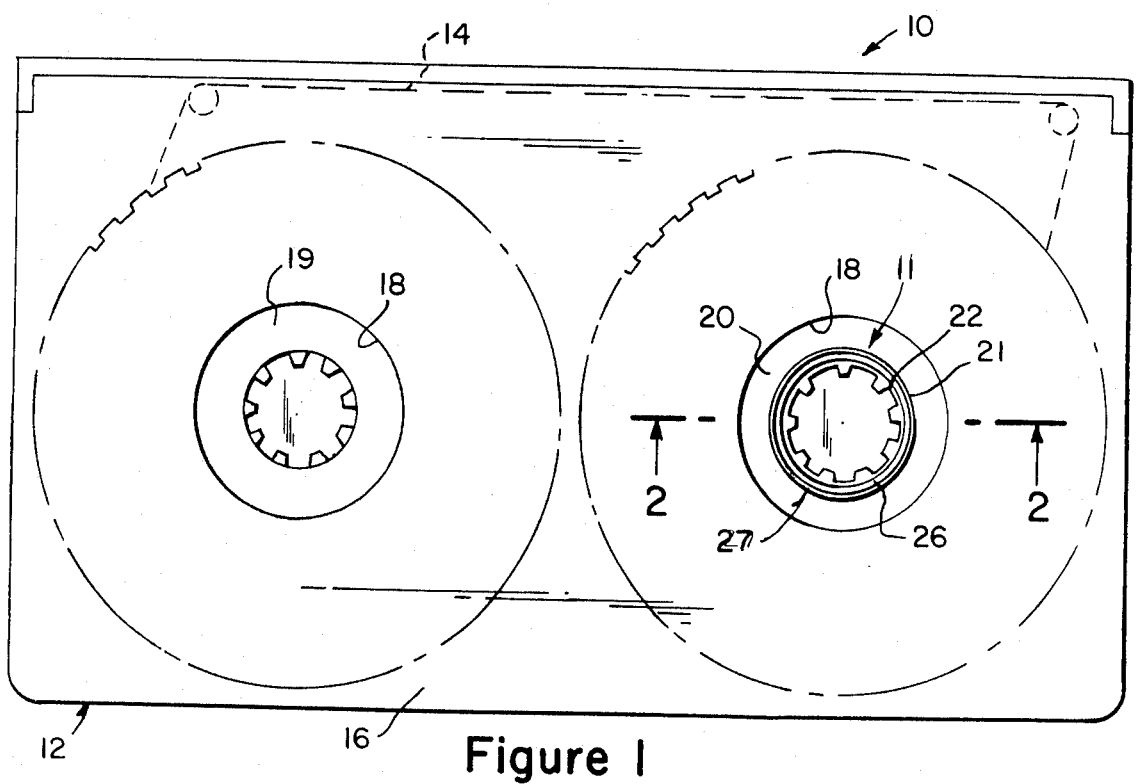
FIG. 1 is a bottom view of a video cassette showing the invention in place in one of the spools therein.

Turning now descriptively to the drawings, in which similar reference characters denote similar elements throughout the several views, FIG. 1 illustrates a limited slip clutch 11 for preventing videotape 14 from breaking in a video cassette 10. The video cassette 10 includes a casing 12, a rear panel 16 with apertures 18 and two spools 19 and 20.

Figure 2:
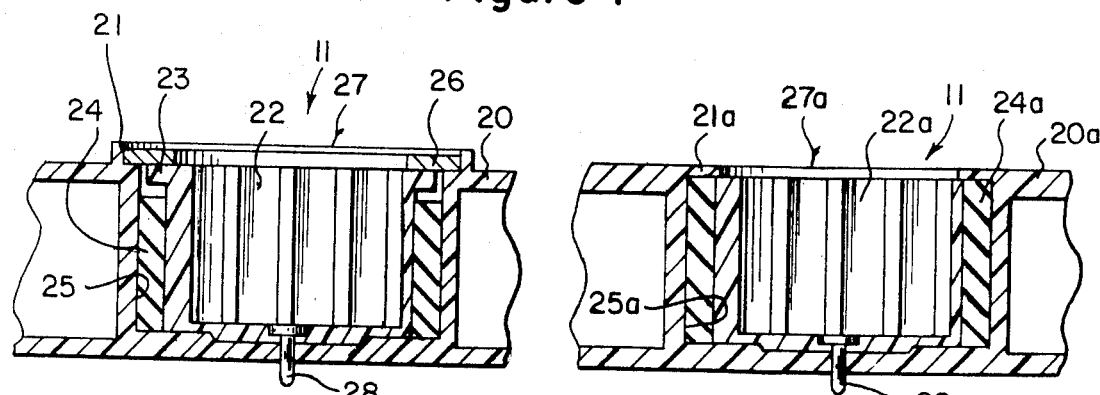
FIG. 2 is an enlarged cross sectional view taken along line 2—2 in FIG. 1 showing the internal structure.

As best seen in FIG. 2, the spool 20 has a central aperture 25 recessed inwardly therein. A friction exerting sleeve member 24 is disposed within the central aperture 25 of the spool 20. A moveable spline hub 22 is disposed within the sleeve member 24 so that the sleeve member is positioned between the spline hub 22 and the central aperture 25 of the spool 20. A bearing spindle 28 extends from the spline hub 22 and through the spool 20.

A structure 27 is provided for holding the sleeve member 24 and the spline hub 22 within the central aperture 25 of the spool 20 but still allows rotation thereabout so that the spline hub 22 can continue to turn against the sleeve member 24 which acts as the limited slip clutch 11, when the spool 20 stops short at end of the videotape 14 thus preventing damage to the videotape.

The holding structure 27 includes a vertical annular flange 21 formed around the central aperture 25 of the spool 20. A horizontal annular flange 23 is formed around exterior of the spline hub 22 with the horizontal annular flange 23 extending over the sleeve member 24. A retaining ring 26 is affixed to spool 20 by glue or equivalent in order to retain hub 22 in the vertical annular flange 21 of the spool 20 so that hub 22 may rotate as required.

Figure 2A:
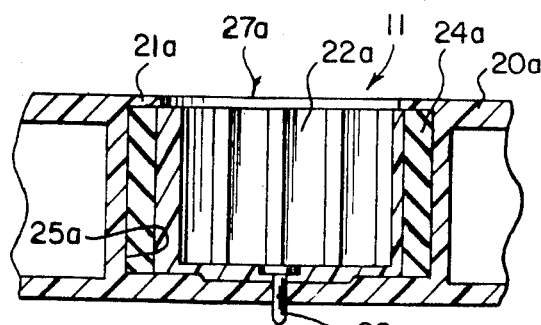
FIG. 2A is an enlarged cross sectional view similar to FIG. 2 showing a first modification.

A first modified holding structure 27a is shown in FIG. 2A in which a horizontal retaining flange 21a is formed around the central aperture 25a of the spool 20a to extend over the sleeve member 24a and the spline hub 22a.

Figure 2B:
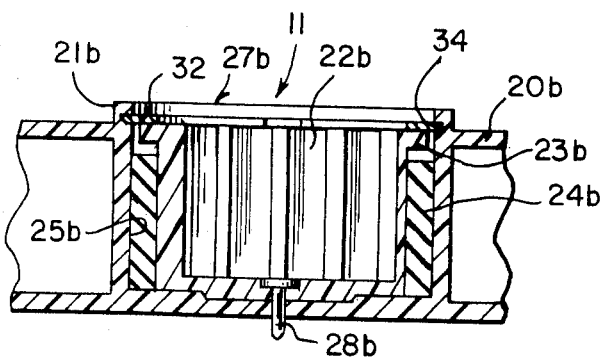
FIG. 2B is an enlarged cross sectional view similar to FIG. 2 showing a second modification.

A second modified holding structure 27b is shown in FIG. 2B that includes a vertical annular flange 21b formed around the central aperture 25b of the spool 20b. The vertical annular flange 21b has an internal annular groove 34 therein. A horizontal annular flange 23b is formed around exterior of the spline hub 22b with the horizontal annular flange 23b extending over the sleeve member 24b. A split ring 32 mates within the internal annular groove 34 in the vertical annular flange 21b. The internal annular groove 34 in the vertical annular flange 21b of the spool 20b is formed at a forty five degree angle and the outer edge of the split ring 32 is formed at a forty five degree angle so that when the split ring 32 mates with the internal annular groove 34 in the vertical annular flange 21b it will become self locking therein.

The material of the sleeve members 24, 24a and 24b can be fabricated out of rubber as shown in the drawings or out of plastic to best act as the limited clutch 11 or any other type of material or configuration that will exert the required pre-determined amount of friction.

It will be understood that each of the elements described above, or two or more together, may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Most important, friction exerting sleeve member 24 may be fabricated from any type of material so long as it provides a pre-determined amount of friction between surfaces 25, 25a and 25b and spline hub 22, 22a and 22b respectfully so as to soften the impact on the tape of a video cassette when said video cassette is stopped by the video tape player said stopping in the prior art causing tapes to break due to the impact of sudden stopping.

In normal use friction exerting sleeve member 24 exerts sufficient friction to rotate spool 20 when a force is exerted on spline hub 22.

What is claimed is new and desired to be protected by Letters Patent is set forth in the appended claims:

1. An apparatus for preventing videotape breakage in a video cassette which comprises:
    (a) a spool having a central aperture recessed inwardly therein;
    (b) a friction exerting sleeve member disposed within said central aperture of said spool;
    (c) a moveable spline hub disposed within said sleeve member so that said sleeve member is positioned between said spline hub and said central aperture of said spool; and
    (d) means for holding said sleeve member and said spline hub within said central aperture of said spool but still allowing rotation thereabout so that said spline hub can continue to turn against said sleeve member when said spool stops short at end of the videotape thus preventing damage to the videotape, said holding means including a vertical annular flange formed around said central aperture of said spool and a horizontal annular flange formed around the exterior of said spline hub so that said horizontal annular flange extends over said sleeve member and a retaining ring affixed to said vertical annular flange of said spool so said horizontal annular flange rides within said vertical annular flange of the spool.

2. An apparatus as recited in claim 1, wherein:
   said vertical annular flange has an internal annular groove therein; and
   said retaining ring is a split ring which mates within said internal annular groove in said vertical annular flange.

3. An apparatus as recited in claim 2, wherein said internal annular groove in said vertical annular flange of said spool is formed at a forty five degree angle and an outer edge of said split ring is formed at a forty five degree angle so that when said split ring mates within said internal annular groove in said vertical annular flange it will become self locking therein.

4. An apparatus as recited in claim 1, wherein said friction exerting sleeve member is fabricated out of rubber.

5. An apparatus as recited in claim 1, wherein said friction exerting sleeve member is fabricated out of plastic.

* * * * *